US006973475B2

(12) United States Patent
Kenyon et al.

(10) Patent No.: US 6,973,475 B2
(45) Date of Patent: Dec. 6, 2005

(54) DYNAMIC SCALABLE MULTI-MEDIA CONTENT STREAMING

(75) Inventors: Jeremy A. Kenyon, Kirkland, WA (US); Alex K. St. John, Kirkland, WA (US)

(73) Assignee: WildTangent, Redmond, WA (US)

( * ) Notice: Subject to any disclaimer, the term of this patent is extended or adjusted under 35 U.S.C. 154(b) by 375 days.

(21) Appl. No.: 09/399,065

(22) Filed: Sep. 18, 1999

(65) Prior Publication Data

US 2002/0065925 A1    May 30, 2002

(51) Int. Cl.[7] .............................................. G06F 15/16
(52) U.S. Cl. ..................... 709/203; 709/204; 709/217; 709/219; 709/231; 709/246
(58) Field of Search ................................ 709/202–204, 709/217–219, 227–228, 231–232, 246–248; 345/418–421

(56) References Cited

U.S. PATENT DOCUMENTS

| | | | | |
|---|---|---|---|---|
| 4,774,496 A | * | 9/1988 | Tomasevich ................. | 341/50 |
| 5,621,660 A | * | 4/1997 | Chaddha et al. ............ | 709/247 |
| 5,666,293 A | | 9/1997 | Metz et al. | |
| 5,832,229 A | * | 11/1998 | Tomoda et al. ............. | 709/227 |
| 5,918,002 A | * | 6/1999 | Klemets et al. ................. | 455/7 |
| 5,928,330 A | * | 7/1999 | Goetz et al. ................. | 709/231 |
| 5,953,506 A | * | 9/1999 | Kalra et al. .................. | 345/428 |
| 5,991,816 A | * | 11/1999 | Percival et al. ............. | 709/247 |
| 6,006,251 A | * | 12/1999 | Toyouchi et al. ........... | 709/203 |
| 6,014,694 A | * | 1/2000 | Aharoni et al. ............. | 709/219 |
| 6,061,722 A | * | 5/2000 | Lipa et al. ................... | 709/224 |
| 6,072,809 A | * | 6/2000 | Agrawal et al. ............ | 370/503 |
| 6,104,392 A | * | 8/2000 | Shaw et al. .................. | 345/335 |
| 6,122,658 A | * | 9/2000 | Chaddha ..................... | 709/203 |
| 6,151,632 A | * | 11/2000 | Chaddha et al. ............ | 709/231 |
| 6,154,768 A | * | 11/2000 | Chen et al. .................. | 709/203 |
| 6,161,137 A | | 12/2000 | Ogdon et al. ............... | 709/229 |
| 6,185,625 B1 | * | 2/2001 | Tso et al. .................... | 709/247 |
| 6,216,157 B1 | * | 4/2001 | Vishwanath et al. ........ | 709/208 |
| 6,219,704 B1 | * | 4/2001 | Kim et al. ................... | 709/224 |

(Continued)

FOREIGN PATENT DOCUMENTS

DE    GB 2 330 429        4/1999

(Continued)

OTHER PUBLICATIONS

"WildTangent Announces Web Driver for Streaming Interactive 2D/3D Media", Jun. 24, 1999, pp. 1-11, XP002175099, retrieved from the Internet: URL:www-.wave-report.com/1999%20Wave%20issues/wave9066.html> retrieved on Aug. 15, 2001! p. 1, paragraph 2 -p. 2, paragraph 2.

*Primary Examiner*—Bharat Barot
(74) *Attorney, Agent, or Firm*—Schwabe, Williamson & Wyatt, P.C.

(57) ABSTRACT

A novel method for streaming multi-media content is disclosed. Multiple versions of model data tailored for different operating environments differentiated in accordance with value(s) of at least one operating characteristic of remote requesting client computer systems are stored in a multi-media content providing server. A multi-media content player of a client computer system determines the operating characteristic value(s) for the at least one operating characteristic of the client computer system. The multi-media content player adaptively requests appropriate versions of selected ones of the model data, based at least in part on the determined operating characteristic value(s) of the at least one operating characteristic of the client computer system. In response, the providing server streams the requested versions of the requested model data to the multi-media content player for rendering. As a result, user experience at the client computer system is enhanced.

38 Claims, 5 Drawing Sheets

U.S. PATENT DOCUMENTS

| | | | |
|---|---|---|---|
| 6,233,017 B1 * | 5/2001 | Chaddha | 348/412 |
| 6,243,392 B1 * | 6/2001 | Uemura et al. | 370/465 |
| 6,247,050 B1 * | 6/2001 | Tso et al. | 709/224 |
| 6,345,279 B1 * | 2/2002 | Li et al. | 707/104 |
| 6,374,237 B1 * | 4/2002 | Reese | 707/3 |
| 6,490,627 B1 * | 12/2002 | Kalra et al. | 709/231 |

FOREIGN PATENT DOCUMENTS

| WO | WO 97 30549 | 8/1997 |
|---|---|---|
| WO | WO 98 03923 | 1/1998 |

* cited by examiner

* GEOMETRY, COLOR, TEXTURE, ANIMATION, LIGHTING, ETC.

DYNAMIC SCALABLE MULTI-MEDIA CONTENT STREAMING

BACKGROUND OF THE INVENTION

1. Field of the Invention

The present invention relates to the fields of computer systems and multimedia contents. More specifically, the present invention relates to streaming of multi-media contents.

2. Background Information

Numerous data compression teachings are known in the art, however only a limited number of these techniques have been applied to multi-media content streaming, including but not limited to video conferencing, computerized gaming and the like. In the area of computerized games, traditionally, they were either simple single-user simulators for pinball, cards, gambling, fighting, etc., or moderately complex multiple-player turn-taking games where each player competed against the game and ultimately compared scores. Well-known high-tech examples of turn-taking games include the Nintendo® and Sony PlayStation® gaming systems; these games provide rich game content through dedicated graphics systems and local storage of graphics data. A significant drawback to these games is the inability to play against remote players and reference a fixed medium such as a CD-ROM distribution.

To overcome the remote player limitation, some games were designed to support modem communication, allowing for a game against a remote player, with the bulk of execution being performed on a remote server. However, this solution was often clumsy, slow, and did not always work consistently. These limitations were partially overcome with the advent of widely available networking systems. Players would initiate separate modem connections to a network hub (e.g., an Internet Service Provider), which in turn provided network connections for each player. This allowed for real-time multiple-player games. However, the slow download issue over a network connection remained substantially unresolved.

The shift to multiple-player games meant that rich game content could no longer be accessed through fast retrieval from local storage, such as over a local bus to a hard disk, game cartridge, or other permanent storage. That is, computer graphics programs use geometry to describe two and three-dimensional objects within their models. In particular, complex object surfaces are usually represented by a combination of one or more basic object shapes, such as splines, non-uniform rational splines (NURBs), texture maps, and (monohedral) triangle tesselation. Typically, an arbitrary object is defined by triangle tesselation, each triangle having associated spatial coordinate tuples X, Y (and perhaps Z), color, normal, and other attributes. This information, when multiplied by hundreds or thousands of polygons in moderately complex objects, amounts to a significant bandwidth requirement for transmitting, receiving, and processing of such model data.

Current dial-up networking connections are not up to the task of transferring such amounts of model information in reasonable time. Modem connections generally realize an average modem bit rate of 14–40 KBits per second (sometimes better), and this is insufficient to directly transfer model data that has previously been retrieved from local storage context. This problem is exacerbated with each additional player, since this same data needs to be distributed to multiple recipients—further consuming bandwidth resources.

In an effort to overcome bandwidth constraints, data and geometry compression has previously been used to reduce information content in 2D and 3D models. Previous compression attempts include image compression (e.g., JPEG), defining objects with shared features (e.g., shared edges), small texture maps for large areas, etc. Examples of some of these and other techniques can be found in U.S. Pat. No. 5,740,409 which teaches a 3D graphics accelerator for compressed geometry, and U.S. Pat. Nos. 5,793,371, 5,867, 167, and 5,870,094 which teach various methods for more-efficiently encoding 3D models.

In addition to geometry compression, general purpose data compression procedures have also been applied to model data. Such techniques include Huffman encoding (See Huffman, "A Method For Construction Of Minimum Redundancy Codes", Proceedings IRE, 40, 10 pages 1098–1100 (September 1952)), Tunstall encoding (See Tunstall Doctoral thesis, "Synthesis of Noiseless Compression Codes", Georgia Institute of Technology (September 1967)), and Lempel-Ziv encoding (See "A Universal Algorithm For Sequential Data Compression", IEEE Transactions on Information Theory, IT-23, 3, pages 337–343 (May, 1977)), and run-length encoding of model data (see, e.g., U.S. Pat. No. 3,656,178).

Even though application of general purpose and geometric compression has increased the viability of multiple-player games and transmission of a large volume of geometry data over a network connection, there still remains a significant amount of information that needs to be transferred before such games are comparable to traditional games having access to locally stored model data. The situation applies equally to other applications involving multi-media content streaminig, e.g. video conferencing.

What is needed then, is some way to further improve the way model data are streamed to network players, conferencing applications, and the like.

SUMMARY OF THE INVENTION

A novel method for streaming multi-media content is disclosed. Multiple versions of model data tailored for different operating environments differentiated in accordance with value(s) of at least one operating characteristic of remote requesting client computer systems are stored in a multi-media content providing server. A multi-media content player of a client computer system determines the operating characteristic value(s) for the at least one operating characteristic of the client computer system. The multi-media content player adaptively requests appropriate versions of selected ones of the model data, based at least in part on the determined operating characteristic value(s) of the at least one operating characteristic of the client computer system. In response, the providing server streams the requested versions of the requested model data to the multi-media content player for rendering.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as multi-media contents, video, audio, graphics, texts, and so forth. Also, parts of the description will also be presented in terms of operations performed by a computer system, using terms such as, determining, requesting, receiving, rendering, and the like. As well understood by those skilled in the art, these quantities or operations take the form of electrical, magnetic, or optical signals being stored, transferred, combined, and otherwise manipulated through electrical, magnetic and optical components of a digital system; and the term digital system includes general purpose as well as special purpose data processing machines, systems, and the like, that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figures 1, 2:
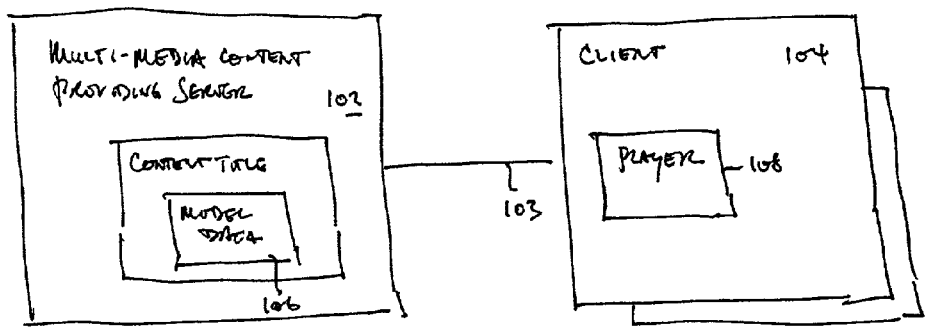
FIG. 1 illustrates an overview of the dynamic scalable content streaming method and apparatus of present invention, in accordance with one embodiment.
FIG. 2 illustrates an example table for assigning different weights to different operating characteristics employed to perform the adaptive request of model data of the present invention, in accordance with one embodiment.

Referring now FIG. 1, wherein a block diagram illustrating an overview of the present invention in accordance with one embodiment is shown. As illustrated, in accordance with the present invention, multi-media content providing server 102 stores multiple versions of compartmentalized model data 106 (of multi-media contents), tailored for different operating environments differentiated in accordance with value(s) of at least one operating characteristic of multi-media content consuming client computer systems 104. Server 102 is communicatively coupled to client computer systems 104 via communication links 103. Each client computer system 104 is provided with a multi-media content player 108 incorporated with the teachings of the present invention. More specifically, the operating characteristic value(s) for the at least one operating characteristic of a client computer system 104 is (are) determined. The multi-media content player 108 adaptively requests appropriate versions of selected ones of model data 106, based at least in part on the determined operating characteristic value(s) of the at least one operating characteristic of the client computer system 104. In one embodiment, the multi-media content player 108 further adapts the requests in accordance with one or more monitored performance indicators of the client computer system 104. In response, server 102 streams the requested versions of the requested model data 106 to multi-media content player 108 for rendering. As a result of the adaptive request and streaming, user experience at the various client computer systems 104 are improved.

Except for the manner model data 106 are organized to enable client computer systems 104 to adaptively request streaming of different versions of selected ones of the model data in accordance with its operating environment (and optionally, its operating condition), server computer system 102 is intended to represent a broad range of communication enabled servers known in the art. Examples of suitable server to practice the present invention include Netfinity Servers, available from IBM of Armonk, N.Y., and Enterprise Servers, available from Sun Microsystems of Menlo Park, Calif. Similarly, except for the incorporation of player 108 of the present invention, client computer systems 104 are intended to represent a broad range of communication enabled personal computer systems, personal digital assistants (PDA), set-top boxes and "electronic appliances" of the like, known in the art. Examples of suitable client computer systems to practice the present invention include Dimension Computers from Dell Computer of Austin, Tex., iMAC from Apple Computer of Cupertino, Calif., and Palm VII from 3COM of San Jose, Calif.

Communication links 103 are intended to represent a broad range of wired and wireless communication medium known in the art. Examples of appropriate wired communication links include direct modem connections over conventional Public Switching Telephone Network (PSTN) lines, private data network connections through e.g. Frame Relay or asynchronous transfer mode (ATM) networks, and public data network connections through e.g. the Internet. Examples of appropriate wireless communication links include cellular as well as satellite connections.

Multi-media contents of which model data 106 are a part is intended to represent a broad range of entertainment, educational, business and other multi-media contents of the like. In one embodiment, multi-media contents are multi-media games, where compartmentalized model data 106 include but not limited to geometry data, lighting data, coloring data, texturing data, animation data, and audio data associated with various models, e.g. a car, a person, an animal and so forth. The various versions of model data 106 are model data 106 compressed with various lossy compression techniques to provide various tradeoff levels between precision and transmission bandwidth requirement. These lossy compression techniques include but not limited to those known in the art, as well as compression techniques disclosed in co-pending U.S. patent application Ser. No. 09/399,062, contemporaneously filed, and entitled "Data Compression Through Adaptive Data Size Reduction", and co-pending U.S. patent application Ser. No. 09/399,063, contemporaneously filed, and entitled "Data Compression Through Offset Representation", which are hereby fully incorporated by reference.

In one embodiment, the values indicative of these operating characteristics (and others) are determined at least at installation time of player 108 on a client computer system 104. That is, player 108 includes an auxiliary operating characteristic determination function, and the installation utility responsible for installing player 108 on a client computer system 104 invokes this auxiliary operating characteristic determination function to perform the determinations in accordance with the teachings of the present invention as an integral part of the installation operation. Installation and the manner the values indicative of these and other operating characteristics may be determined are operating environment dependent. For the Window® family of operating systems (available from Microsoft Corporation of Redmond, Wash.), installation may be accomplished via the well known "set-up" approach, and the values for these operating characteristics may be obtained by querying the registry of the operating system, and if necessary, the various configuration files, i.e. config.sys, system.ini, window.ini, and so forth. For Intel® architecture compatible system, if necessary, the values may also be obtained by accessing the configuration information maintained by the Basic Input/Output System (BIOS). In other environments, if necessary, some of these values may be determined through benchmarking. For example, in the case of communication bandwidth, it may be determined by performing a number of sample transmissions over a period of time. In the case of memory size, it may be determined by making successive accesses to larger and larger addresses (starting from a low address) or to lower and lower addresses (starting from an arbitrary large address).

In one embodiment, where values for multiple environmental characteristics are determined, a composite operating environment index (COEI) is formed based on the determined values to allow all the environmental characteristics to be considered simultaneously. In one embodiment, the COEI is formed by assigning different weights to the determined values of the different environmental characteristics. In one embodiment, the values for each environmental character is normalized into a range where the most capable end of the range is assigned the weight of 1, the least capable end of the range is assigned the weight of 0, and the intermediate capabilities are assigned corresponding values between 0 and 1 (see the example weight assignment table of FIG. 2). In alternate embodiments, other weighting factors, as well as other approaches may be employed to facilitate the simultaneous considerations of multiple operating environmental characteristics.

In one embodiment, the performance indicators of client computer systems 104 monitored include bandwidth utilization, CPU utilization, memory utilization, memory swapping, cache hit rate, and audio frames drop rate. In other embodiments, more or less performance indicators may be monitored. In one embodiment, the current values for these performance indicators are obtained by an auxiliary performance monitor provided to player 108, making periodic queries to the operating system. In other embodiments, one or more of these performance indicators (when not supported by the operating system) may be benchmarked by the auxiliary performance monitor itself.

In one embodiment, where the above described COEI is employed to facilitate simultaneous consideration of multiple operating environment characteristics, the auxiliary performance monitor, in response to the receipt of the performance values from the underlying operating system, temporarily adjusts the COEI up or down to influence the selected ones, and the versions of the selected ones of model data 106 adaptively requested by player 108.

Figure 3:
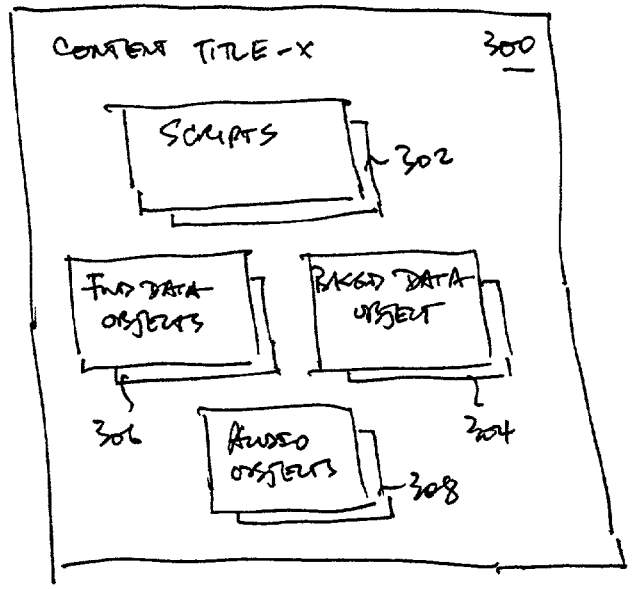
FIG. 3 illustrates an example content of a multi-media content title, in accordance with one embodiment.

FIG. 3 illustrates an example organization of a multi-media content title, in accordance with one embodiment. As illustrated, multi-media content title 300 is an interactive multi-media content title. It includes one or more scripts 302 specifying various actions to be taken at initialization time of the title, in response to user inputs, and when user inputs are not present. In addition to scripts 302, title 300 includes model data 106. For the illustrated embodiment, model data 106 includes a number of background scene objects 304, foreground model objects 306 and audio objects 308. At least the foreground model objects 306 are compartmentalized into the earlier described geometry data, texture data, coloring data, lighting data, animation data and so forth. In other embodiments, more planes (i.e. foreground and background) as well as more or less compartmentalization (i.e. geometry, color, and so forth) may be employed.

Figure 4:
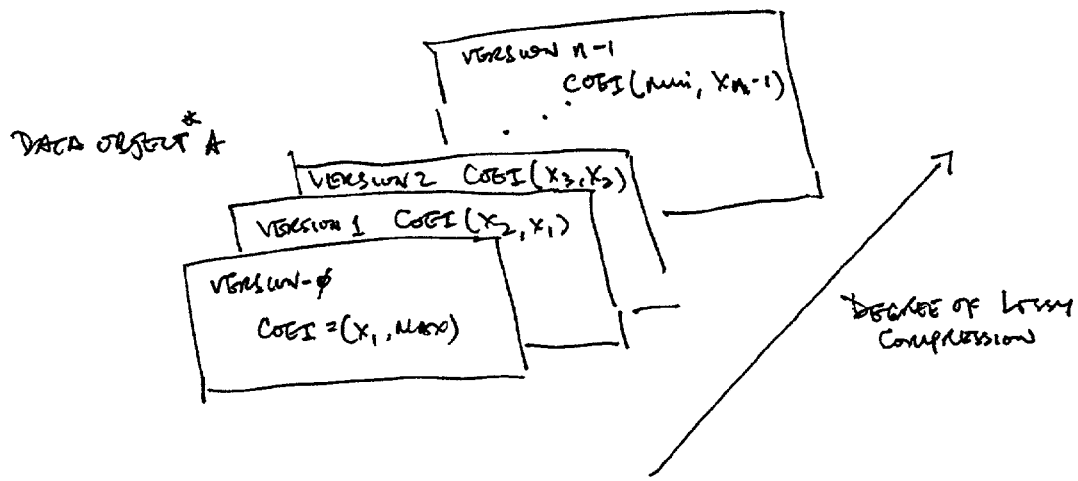
FIG. 4 illustrates an example organization of model data on a multi-media content providing server, in accordance with one embodiment.

FIG. 4 illustrates the organization of model data 106 in accordance with one embodiment, where the above described COEI is employed. For the illustrated embodiment, for at least each of the geometry data objects, n versions of the data object representing different tradeoff levels between precision and transmission bandwidth requirements are maintained. For the sample geometry data object A, its version-0 corresponds to an uncompressed version, to be used in operating environments with a COEI score range of ($x_1$, max), where $x_1$ is smaller than max; its version-1 corresponds to a compressed version, to be used in operating environments with a COEI score range of ($x_2$, $x_1$), where $x_2$ is smaller than $x_1$; and so forth. For different data objects, n as well as the COEI score ranges may be different.

Figure 5:
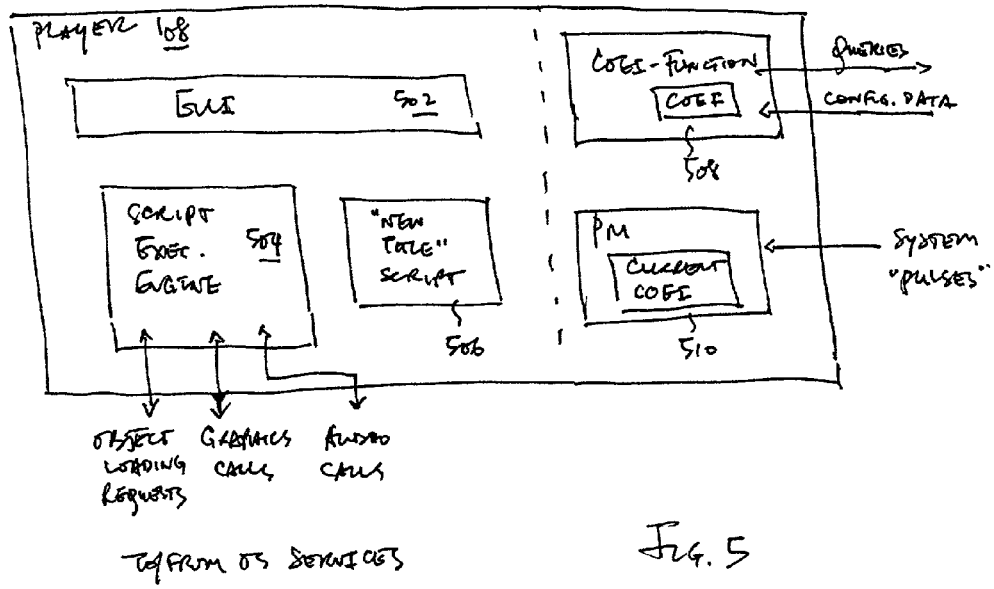
FIG. 5 illustrates a block diagram view of the multi-media content player of the present invention, in accordance with one embodiment.

FIG. 5 illustrates player 108 in further detail in accordance with one embodiment. As illustrated, player 108 includes end-user interface (EUI) 502, script execution engine 504, and "new title" script 506. End-user interface 502 is responsible for facilitating interaction with a user of player 108. Script execution engine 504 is responsible for executing "new title" script 506 and scripts of multi-media content titles (see FIG. 3). Additionally, as described earlier, player 108 further includes first and second auxiliary functions 508 and 510. First auxiliary function 508 is invoked to determine the values of the various operating characteristics, and COEI, if applicable, as described earlier. Second auxiliary function 510 is invoked to monitor the various performance indicators of interest of client computer systems 104, as described earlier.

Script execution engine 504 is intended to represent a broad range of "script" execution environment known in the art. In one embodiment where script 506 and scripts of multi-media content titles are implemented using Java™Script or script languages of the like, script execution engine 504 is a Java™Script execution environment or a script execution environment of like kind.

EUI 502, script 506, and an example script of a multi-media content title are described below referencing FIGS. 6–8.

Figure 6:
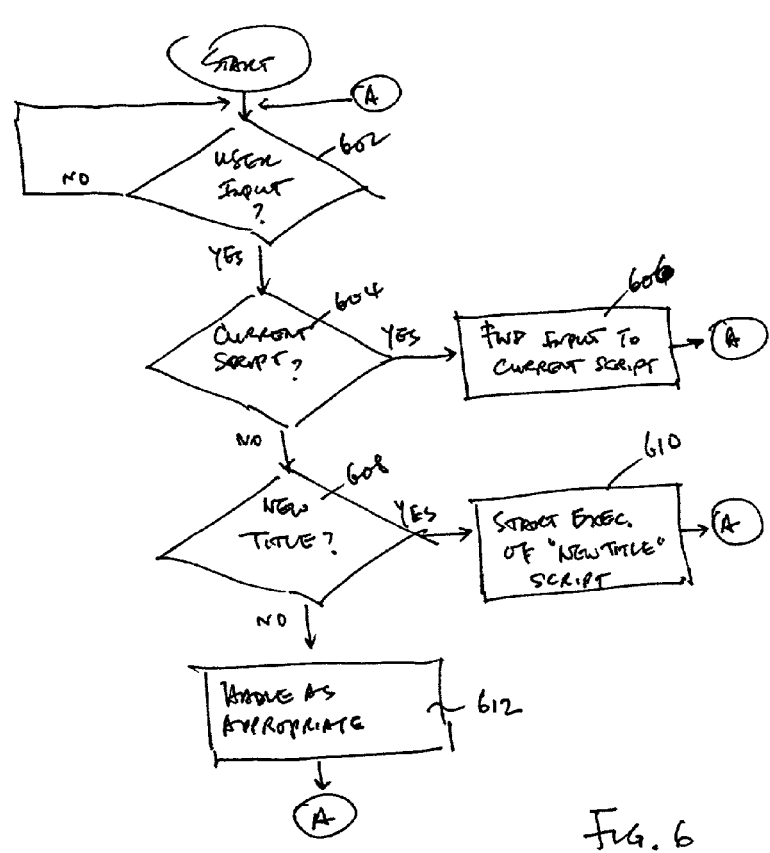
FIG. 6 illustrates the operational flow of the end-user interface of the multimedia content player of the present invention, in accordance with one embodiment.

Referring now to FIG. 6, wherein a block diagram illustrating the operational flow of EUI 502 in accordance with one embodiment is shown. As shown, at 602, EUI 502 awaits inputs from a user. Upon receipt of an user input, EUI 502 determines if the input is for a current executing script of a multi-media content title, 604. If so, EUI 502 forwards the user input to the current executing script for handling, 606. Upon doing so, EUI 502 continues operation at 602. On the other hand, if the input is not intended for a current executing script, EUI 502 further determines if the user is attempting to start a new title, 608. If so, EUI 502 starts execution of the earlier described "new title" script, 610. In like manner, upon doing so, EUI 502 continues operation at 602. However, if the user input is not intended to start a new title, EUI 502 handles the input (e.g. an user command) in an application dependent manner.

Figure 7:
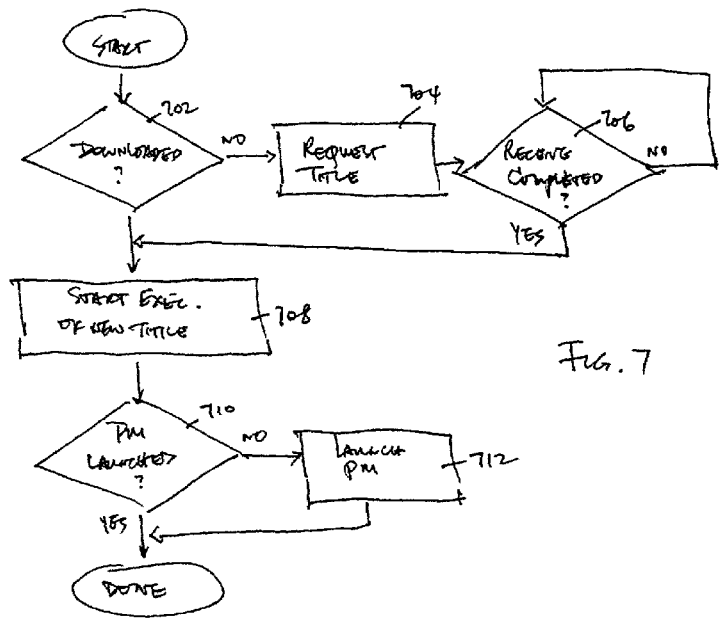
FIG. 7 illustrates the operational flow of the "new title" script of the multimedia content player of the present invention, in accordance with one embodiment.

FIG. 7 illustrates the operational flow of "new title" script 506 in accordance with one embodiment. As illustrated, at 702, "new title" script 506 determines if the requested title has previously been downloaded. If the requested title has not been previously downloaded, "new title" script 506 requests downloading of the new title from server 102 accordingly, 704; otherwise, "new title" script 506 skips request operation 704. If request of the new title is necessary, "new title" script 506 may additionally request the operating system to establish a communication connection to server 102, if a connection to server 102 does not currently exist. In any event, upon determining that the requested title was previously downloaded, or upon receiving the newly requested title, "new title" script 506 causes execution of the (initial or main) script of the requested title to begin, 708.

For the illustrated embodiment, upon causing execution of the (initial or main) script of the requested title to begin, "new title" script 506 further determines if the auxiliary performance monitor function 510 have been launched, 710. If the auxiliary performance monitor function 510 have been launched, no further action are taken, otherwise, "new title" script 506 further causes the auxiliary performance monitor function 510 to be launched, 712, to monitor various performance indicators of interest of client computer system 104, and to adjust COEI, as described earlier, to influence the selected ones and the versions of the selected ones of model data 106 being requested.

Figure 8:
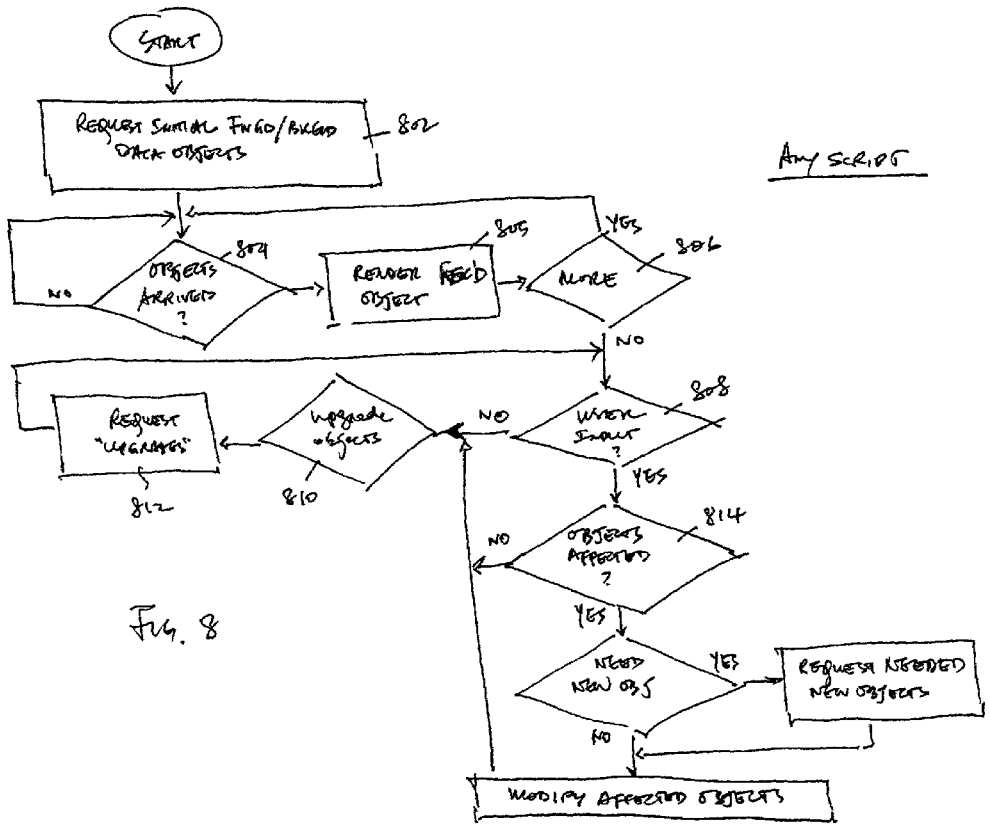
FIG. 8 illustrates the operational flow of an example script of a multi-media content title of the present invention, in accordance with one embodiment.

FIG. 8 illustrates the operational flow of an example script of a multi-media content title in accordance with one embodiment. As illustrated, at 802, the example script requests an initial round of foreground and background data objects. In accordance with the present invention, the script is designed to request a small set of data objects, to reduce a user's perception of start-up time. In addition to limiting the initial set of data objects to a small set, the script further requests versions of the data objects that tradeoff precision for reducing transmission bandwidth requirement, consistent with the COEI of the client computer system, to further reduce a user's perception of start-up time. In one embodiment, the request is made by calling appropriate ones of the communication services of the operating system to package and deliver the request to server 102. For the illustrated embodiment, the script further requests the coloring, lighting, texture and animation objects, after requesting the geometry and audio objects first, to enhance the likelihood that the geometry and audio objects will be returned prior to the secondary objects, that is coloring, lighting, animation and so forth, to again further reduce the user's perceive start-up time. In an alternate embodiment, the script may even forego requesting some of the associated data objects, i.e. lighting, texture, and so forth. At 804–806, the script renders the requested model data as they arrive, making the necessary calls to the operating system's graphics and audio services. For the illustrated embodiment, the script will automatically synchronize rendering for at least the audio object in view of the timing of its arrival. That is, if for example, the audio object is for 1 min. of audio, and execution of the title has proceeded to 0.25 min beyond when the audio object was needed, the script will skip or drop the first 0.25 min of audio, and commence with the rendering at 0.26 min into the audio object. As a result of requesting a small initial set of objects, the order of requesting these objects, the transmission friendly manner of requesting (i.e. the low bandwidth requirement versions, as well as the optional foregoing of some of the associated data objects), the script is able to give the user the perception of earlier operation than otherwise possible.

At 808, the script awaits the user's inputs. For the illustrated embodiment, while there are no inputs, the script determines if some of the downloaded objects should be upgraded to include previously forego associated data objects, or to higher precision versions of these data objects, 810. The determination is made based at least in part on the monitored performance indicators, by examining the COEI to determine if it has been updated to a higher performance level. If so, the script requests the updates, i.e. the previous forego data objects and/or the higher precision versions of some of the existing objects, 812.

If user inputs were received at 808, the script determines if any of the objects are to be re-rendered in a modified manner, e.g. at a different location or with a different animation version, and whether new objects are to be rendered, 814. If not, the script proceeds to 810 and continues its operation as described earlier. If either at least one of the object is to be re-rendered in a modified manner, or a new object is to be rendered, the script determines if it has all the data objects necessary to accomplish the task, 816. If additional data objects are required, the script requests versions of the required data objects consistent with the operating environment and the current operating condition, 818. For the illustrated embodiment, as described earlier, the appropriate version is determined based at least in part on the current performance level indicated by COEI. In any event, upon determining that it has the necessary data objects or upon receipt of the newly requested data objects, the script causes the data objects to be rendered, making the necessary calls to the operating system's graphics and audio services, as described earlier, 820. Upon rendering the data objects, the script proceeds to 810 and continues as described earlier.

Figure 9:
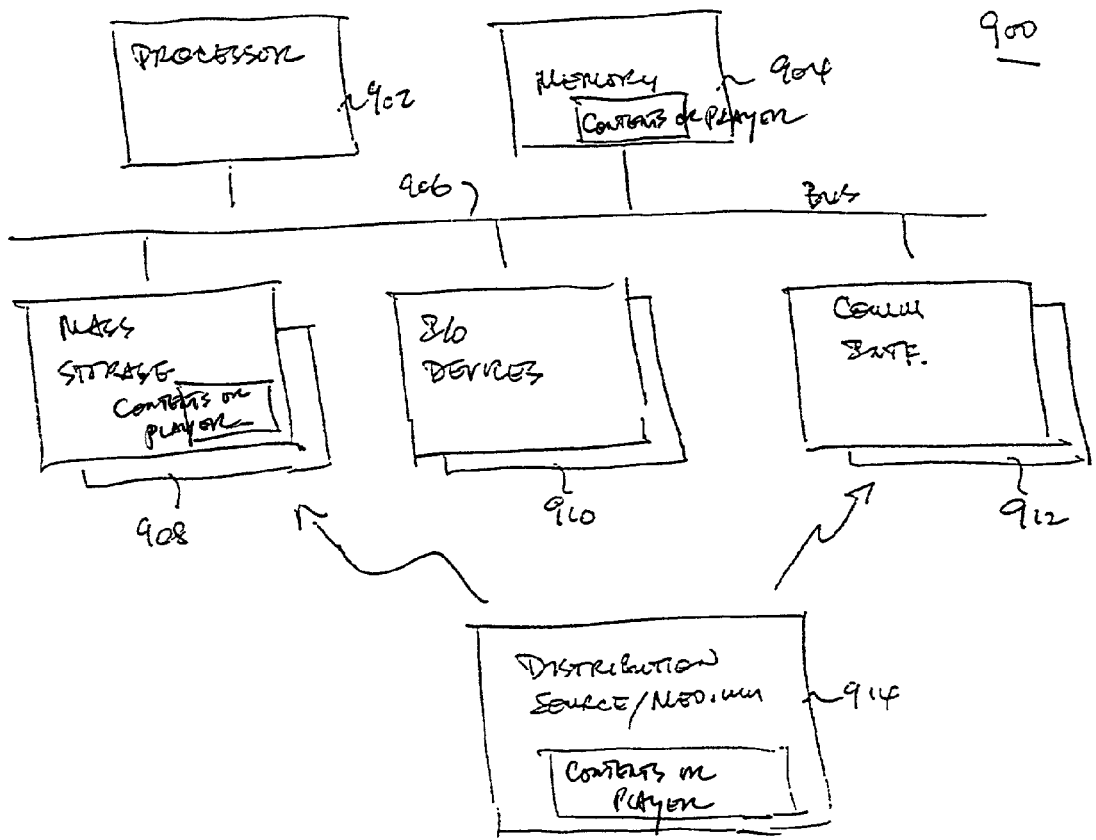
FIG. 9 illustrates an example computer system suitable for practicing as either a content creation system or a content consumption system, in accordance with one embodiment.
Figures 1, 2:
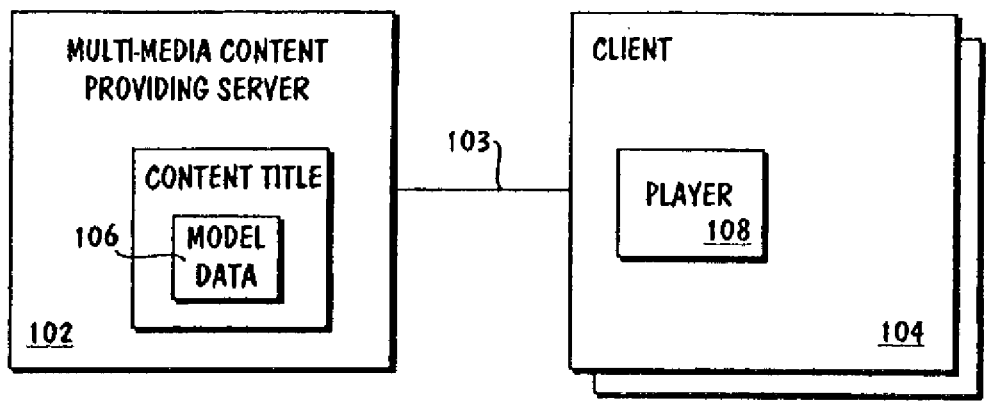
Figure 3:
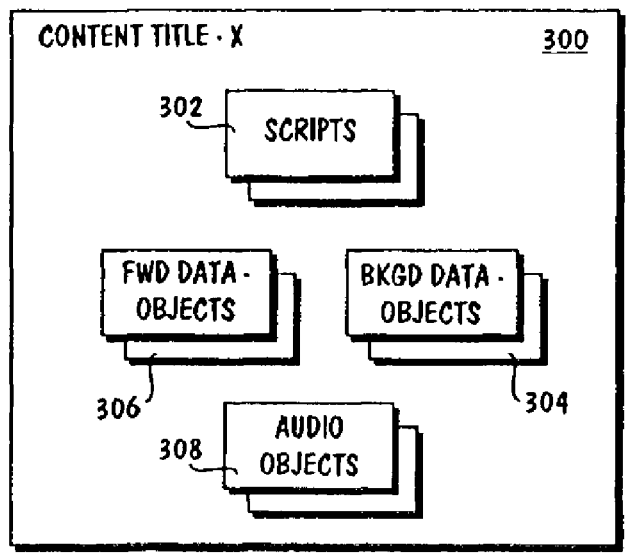
Figure 4:
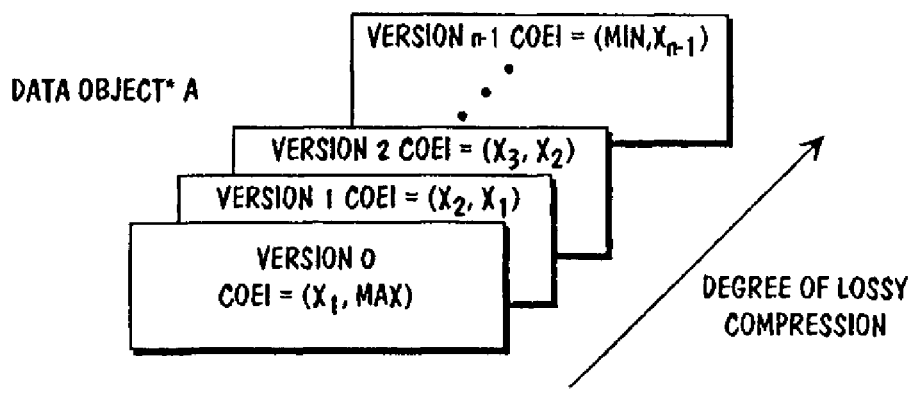
Figure 5:
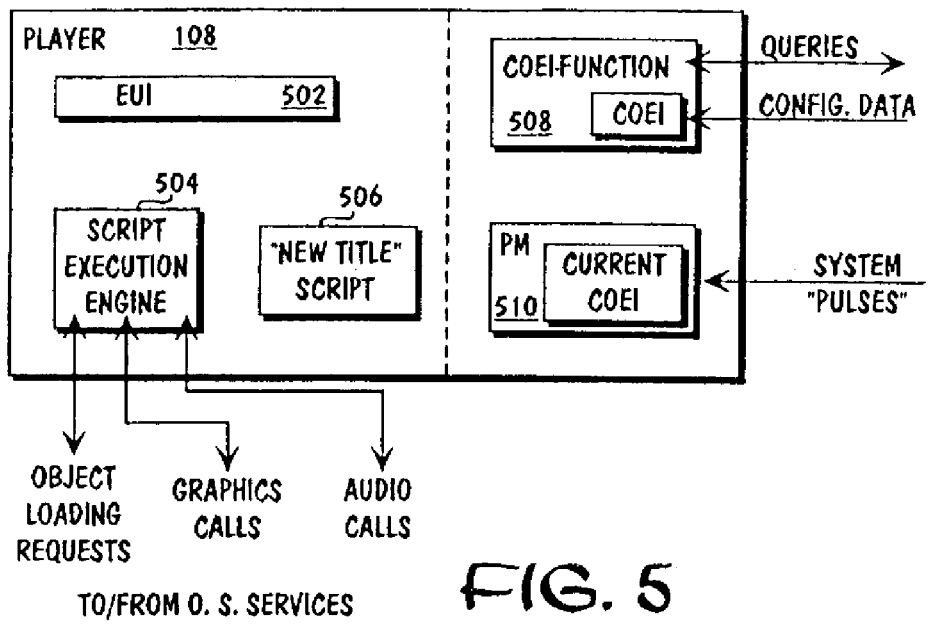
Figure 6:
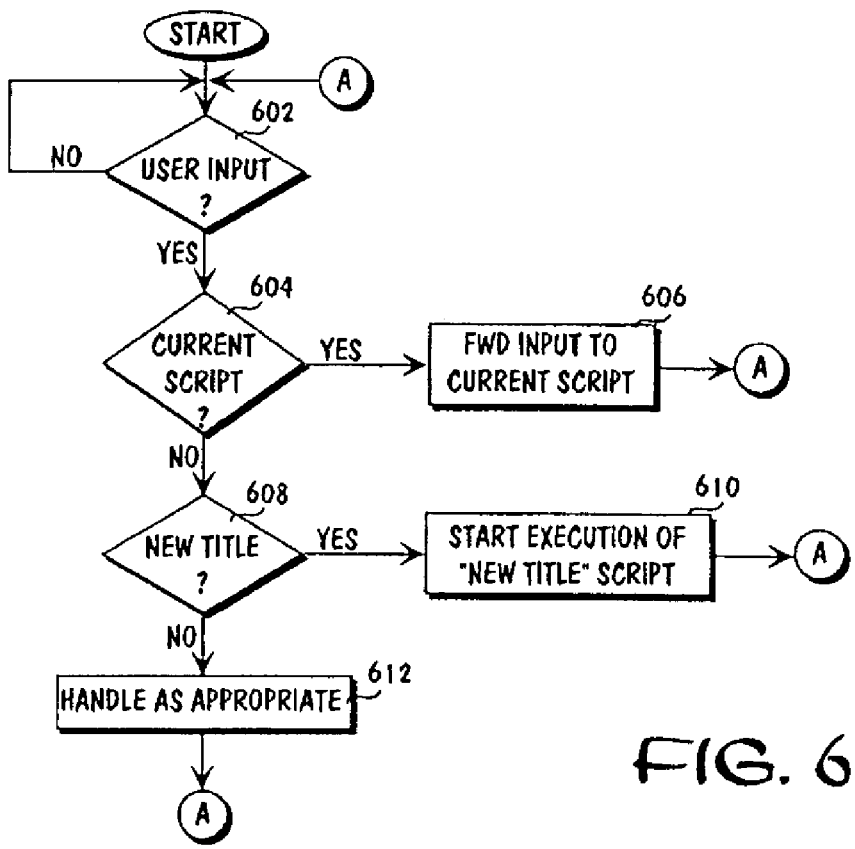
Figure 7:
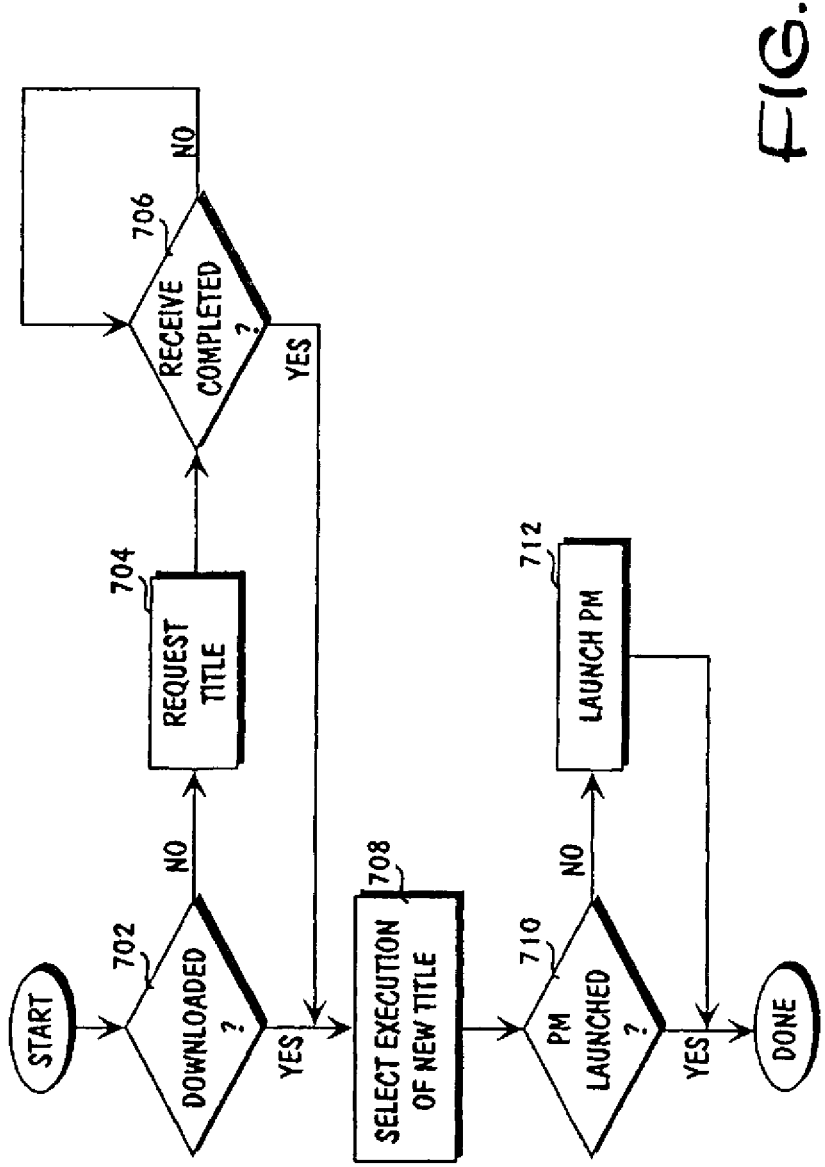
Figure 8:
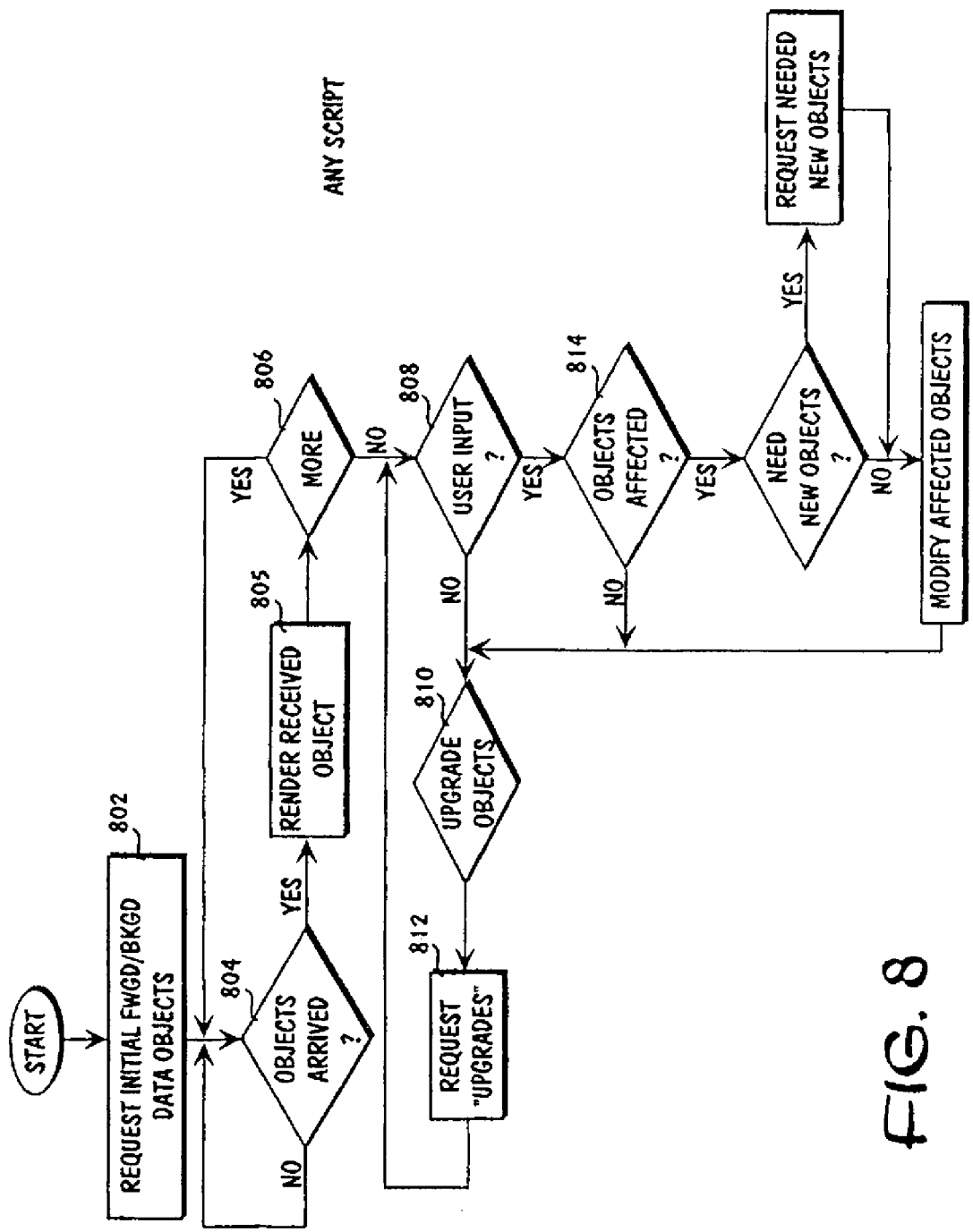
Figure 9:
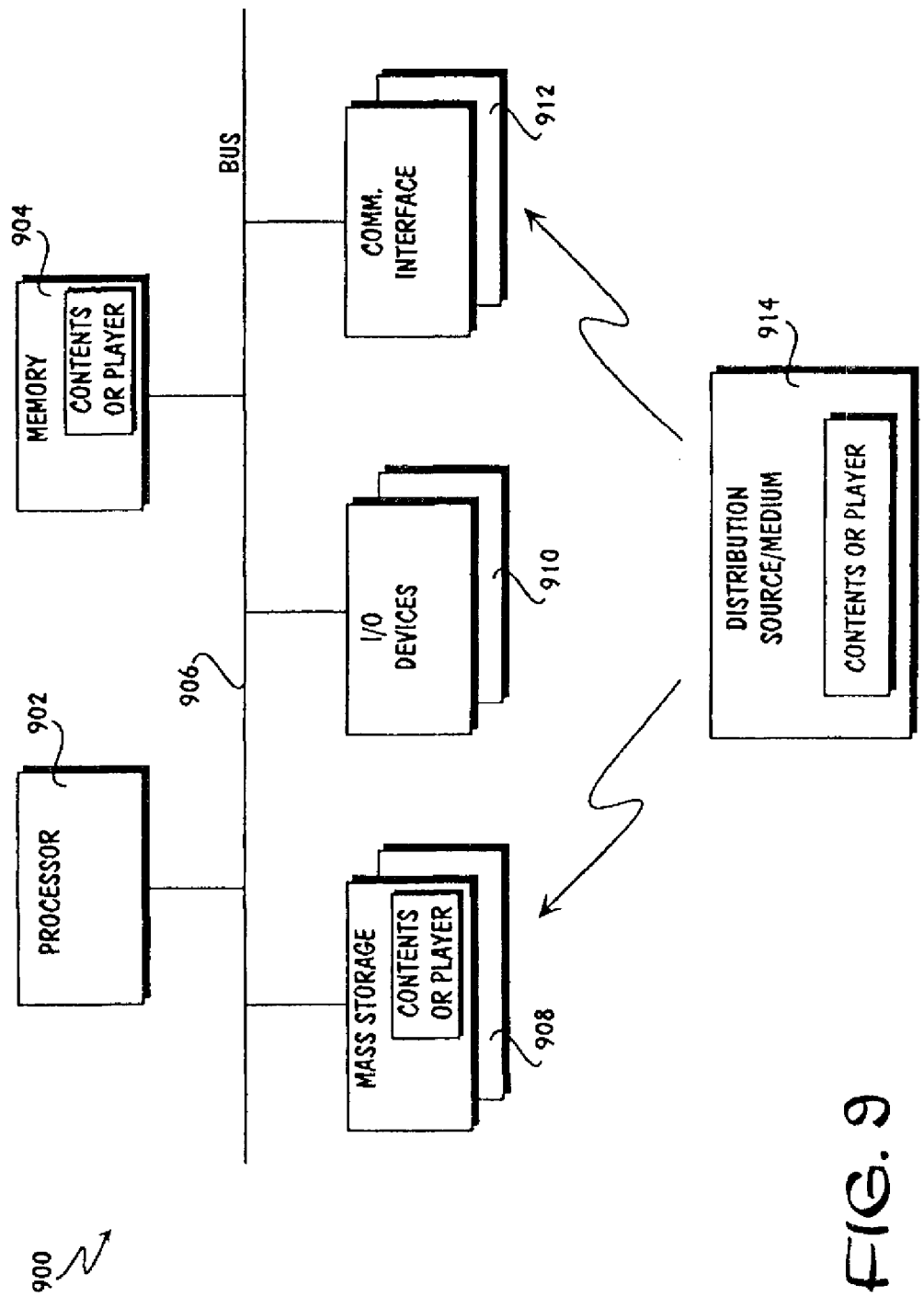

FIG. 9 illustrates one embodiment of a computer system suitable for use to practice as either a server system or a client system of the present invention. As shown, computer system 900 includes processor 902 and memory 904 coupled to each other via system bus 906. Typically (although not necessary), for use as a server, i.e. for storage and provision of model data 106 of multi-media content titles, processor 902, memory 904, and system bus 906 are usually higher performance models of these elements, whereas for use as a client system, i.e. execution of player 108, the lower performance models are employed instead. Coupled to system bus 906 are non-volatile mass storage 908, such as hard disks, floppy disk, and so forth, input/output devices 910, such as keyboard, displays, and so forth, and communication interfaces 912, such as modem, LAN interfaces, and so forth. Each of these elements perform its conventional functions known in the art. In particular, system memory 904 and non-volatile mass storage 908 are employed to store a working copy and a permanent copy of the programming instructions implementing the above described teachings of the present invention, e.g. an underlying operating system, and model data 106 or player 108. As described earlier, the permanent copy of the programming instructions implementing model data 106 or player 108 is preferably loaded through communication interfaces 912, although it may be loaded through fix form distribution medium, such as diskettes, CD or DVD. The constitution of elements 902–914 are well known, and accordingly will not be further described.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a method and apparatus for dynamic scalable content streaming has been described.

What is claimed is:

1. In a client computer system, a method of operation comprising:
    determining operating characteristic value(s), by the client system, for at least one operating characteristic of the client computer system;
    adaptively requesting, by the client system, streaming of model data; comprising geometry data, from a remote content providing server, adjusting said requesting based at least in part on the determined operating characteristic value(s) of the at least one operating characteristic of the client computer system.

2. The method of claim 1, wherein the at least one operating characteristic comprises one or more operating characteristics selected from a group consisting of communication bandwidth, processor power, availability of memory, availability of swap space, memory and bus speed, availability of video memory, availability of digital signal processing for audio decompression, and availability of graphics acceleration.

3. The method of claim 1, wherein said determining is performed as an integral part of an installation of a multi-media content player, and said adaptively requesting streaming of model data is performed by said multi-media content player.

4. The method of claim 1, wherein said model data comprise of data selected from a group consisting of lighting data, coloring data, texturing data, animation data, and audio data.

5. The method of claim 1, wherein said adaptively requesting of streaming of model data comprises adaptively requesting the remote content providing server for different versions of the model data based at least in part on the determined operating characteristic value(s) of the at least one operating characteristic of the client computer system.

6. The method of claim 1, wherein the method further comprises monitoring at least one performance indicator for the client computer system.

7. The method of claim 6, wherein said at least one performance indicator comprises one or more selected from a group consisting of bandwidth utilization, CPU utilization, memory utilization, memory swapping, cache hit rate, and audio frames drop rate.

8. The method of claim 6, wherein said adaptively requesting of streaming of model data comprises switching to requesting the remote content providing server for higher precision versions of the model data, responsive to indicator value(s) of the monitored at least one performance indicator.

9. The method of claim 6, wherein said adaptively requesting of streaming of model data comprises switching to requesting the remote content providing server for lower precision versions of the model data, responsive to indicator value(s) of the monitored at least one performance indicator.

10. The method of claim 1, wherein the method further comprises automatically synchronizing rendering of the received model data in accordance with the timeliness of the receipt of the model data.

11. The method of claim 10, wherein said automatic synchronization of rendering of the received model data comprises dropping audio data in proportion to the amount of the time the audio data arrived late.

12. The method of claim 1, wherein said determining of operating characteristic value(s) further comprises determining a single composite operating characteristic value based on the determined operating characteristic values of the at least one operating characteristic.

13. The method of claim 12, wherein said determining of said single composite operating characteristic value comprises computing a weighted index that weighs relative importance of said at least one operating characteristic.

14. A client computer comprising:
    a processor to execute programming instructions; and
    a storage medium, coupled to the processor, having stored therein a first and a second plurality of programming instructions to be executed by the processor, the first plurality of programming instructions, when executed, determine operating characteristic value(s), by the client computer system, for at least one operating characteristic of the client computer system, and the second plurality of programming instructions, when executed, adaptively request, by the client computer system, streaming of model data, comprising geometry data, from a remote content providing server, adjusting said requesting based at least in part on the determined operating characteristic value(s) of the at least one operating characteristic of the client computer system.

15. The client computer system of claim 14, wherein the at least one operating characteristic comprises one or more operating characteristics selected from a group consisting of communication bandwidth, processor power, availability of memory, availability of swap space, memory and bus speed, availability of video memory, availability of digital signal processing for audio decompression, and availability of graphics acceleration.

16. The client computer system of claim 14, wherein the first and second plurality of programming instructions implement a multi-media content player, and said first plurality of programming instructions are executed when the first and second plurality of programming instructions are installed on said client computer system, and when the second plurality of programming instructions are executed to download a multi-media title.

17. The client computer system of claim 14, wherein said model data comprise of data selected from a group consisting of lighting data, coloring data, texturing data, animation data, and audio data.

18. The client computer system of claim 14, wherein when executed, said second plurality of programming instructions adaptively request the remote content providing server for different versions of the model data based at least in part on the determined operating characteristic value(s) of the at least one operating characteristic of the client computer system.

19. The client computer system of claim 14, wherein the second plurality of programming instructions further monitor at least one performance indicator for the client computer system.

20. The client computer system of claim 19, wherein said at least one performance indicator comprises one or more selected from a group consisting of bandwidth utilization, CPU utilization, memory utilization, memory swapping, cache hit rate, and audio frames drop rate.

21. The client computer system of claim 19, wherein when executed, said second plurality of programming instructions switch to requesting the remote content providing server for higher precision versions of the model data, responsive to indicator value(s) of the monitored at least one performance indicator.

22. The client computer system of claim 19, wherein when executed, said second plurality of programming instructions switch to requesting the remote content providing server for lower precision versions of the model data, responsive to indicator value(s) of the monitored at least one performance indicator.

23. The client computer system of claim 14, wherein when executed, said second plurality of programming instructions further automatically synchronize rendering of the received model data based at least in part on the timeliness of the receipt of the model data.

24. The client computer system of claim 23, wherein when executed, said second plurality of programming instructions automatically drop audio data in proportion to the amount of the time the audio data arrived late.

25. The method of claim 14, wherein said determining of operating characteristic value(s) further comprises determining a single composite operating characteristic value based on the determined operating characteristic values of the at least one operating characteristic.

26. The method of claim 25, wherein said determining of said single composite operating characteristic value comprises computing a weighted index that weighs relative importance of said at least one operating characteristic.

27. In a computer server, a method of operation comprising:
   storing multiple versions of model data, comprising geometry data, tailored for different operating environments differentiated in accordance with value(s) of at least one operating characteristic of a remote requesting client computer system;
   accepting requests from the remote requesting client system for said model data that adaptively includes version selection designations, with the inclusion being adjusted, by the remote requesting client computer system, based at least in part on the operating characteristics of the remote requesting client computer system; and
   streaming the requested versions of the model data to the remote requesting client computer system, responsive to the accepted requests.

28. The method of claim 27, wherein the at least one operating characteristic comprises one or more operating characteristics selected from a group consisting of communication bandwidth, processor power, availability of memory, availability of swap space, memory and bus speed, availability of video memory, availability of digital signal processing for audio decompression, and availability of graphics acceleration on the remote requesting client computer system.

29. The method of claim 27, wherein said model data comprise of data selected from a group consisting of lighting data, coloring data, texturing data, animation data, and audio data.

30. A computer server comprising:
   a processor to execute programming instructions; and
   a storage medium, coupled to the processor, having stored therein multiple versions of model data, comprising geometry data, tailored for different operating environments differentiated in accordance with value(s) of at least one operating characteristic of a remote requesting client computer system, and a plurality of programming instructions, when executed, accept requests from the remote requesting client computer system for said model data that adaptively includes, by the remote requesting client computer system, version selection designations, with the inclusion being adjusted based at least in part on said operating characteristic of the remote requesting client computer system, and stream the requested versions of the model data to the remote requesting client computer system, responsive to the accepted requests.

31. The computer server of claim 30, wherein the at least one operating characteristic comprises one or more operating characteristics selected from a group consisting of communication bandwidth, processor power, availability of memory, availability of swap space, memory and bus speed, availability of video memory, availability of digital signal processing for audio decompression, and availability of graphics acceleration on the remote requesting client computer system.

32. The computer server of claim 30, wherein said model data comprise of data selected from a group consisting of lighting data, coloring data, texturing data, animation data, and audio data.

33. A method for streaming multi-media content comprising:
   storing by a multi-media content providing server, multiple versions of model data, comprising geometry data, tailored for different operating environments differentiated in accordance with value(s) of at least one operating characteristic of a remote requesting client computer system;
   determining by a multi-media content player of the remote requesting client computer system, operating characteristic value(s) for at least one operating characteristic of the remote requesting client computer system;
   adaptively requesting by the multi-media content player of the remote requesting client computer system, different versions of model data from the multi-media content providing server, adjusting said requesting based at least in part on the determined operating characteristic value(s) of the at least one operating characteristic of the remote requesting client computer system; and
   streaming by the multi-media content providing server, the requested versions of the model data, responsive to the requests of the multi-media content player.

34. The method of claim 33, wherein said determining is performed as an integral part of an installation of a multi-media content player, and re-performed by the multi-media content player at download time of a multi-media title.

35. The method of claim 33, wherein the method further comprises monitoring by the multi-media content player, at least one performance indicator for the remote requesting client computer system.

36. The method of claim 35, wherein said adaptively requesting by the multi-media content player comprises switching to requesting the multi-media content providing server for higher precision versions of the model data, responsive to indicator value(s) of the monitored at least one performance indicator.

37. The method of claim 35, wherein by the multi-media content player comprises switching to requesting the multi-media content providing server for lower precision versions of the model data, responsive to indicator value(s) of the monitored at least one performance indicator.

38. The method of claim 33, wherein the method further comprises automatically synchronizing by the multi-media player, rendering of the received model data based at least in part on the timeliness of the receipt of the model data.

* * * * *

UNITED STATES PATENT AND TRADEMARK OFFICE
CERTIFICATE OF CORRECTION

PATENT NO.          : 6,973,475 B2
APPLICATION NO. : 09/399065
DATED                  : December 6, 2005
INVENTOR(S)        : Hayes It is certified that error appears in the above-identified patent and that said Letters Patent is hereby corrected as shown below:

The Title Page, showing an illustrative figure should be deleted and substitute therefor the attached Title Page.

Delete Drawing Sheets 1-6 and substitute therefor the Drawing Sheets consisting of Figs 1-9 as shown on the attached pages.

Signed and Sealed this

Twenty-sixth Day of May, 2009

JOHN DOLL
*Acting Director of the United States Patent and Trademark Office*

(12) United States Patent
Kenyon et al.

(10) Patent No.: US 6,973,475 B2
(45) Date of Patent: Dec. 6, 2005

(54) DYNAMIC SCALABLE MULTI-MEDIA CONTENT STREAMING

(75) Inventors: Jeremy A. Kenyon, Kirkland, WA (US); Alex K. St. John, Kirkland, WA (US)

(73) Assignee: WildTangent, Redmond, WA (US)

( * ) Notice: Subject to any disclaimer, the term of this patent is extended or adjusted under 35 U.S.C. 154(b) by 375 days.

(21) Appl. No.: 09/399,065

(22) Filed: Sep. 18, 1999

(65) Prior Publication Data
US 2002/0065925 A1 May 30, 2002

(51) Int. Cl.[7] ............................................. G06F 15/16
(52) U.S. Cl. .................. 709/203; 709/204; 709/217; 709/219; 709/231; 709/246
(58) Field of Search ........................... 709/202–204, 709/217–219, 227–228, 231–232, 246–248; 345/418–421

(56) References Cited

U.S. PATENT DOCUMENTS

| | | | | |
|---|---|---|---|---|
| 4,774,496 A | * | 9/1988 | Tomasevich | 341/50 |
| 5,621,660 A | * | 4/1997 | Chaddha et al. | 709/247 |
| 5,666,293 A | | 9/1997 | Metz et al. | |
| 5,832,229 A | * | 11/1998 | Tomoda et al. | 709/227 |
| 5,918,002 A | | 6/1999 | Klemets et al. | 455/7 |
| 5,928,330 A | * | 7/1999 | Goetz et al. | 709/231 |
| 5,953,506 A | * | 9/1999 | Kalra et al. | 345/428 |
| 5,991,816 A | * | 11/1999 | Percival et al. | 709/247 |
| 6,006,251 A | * | 12/1999 | Toyouchi et al. | 709/203 |
| 6,014,694 A | * | 1/2000 | Aharoni et al. | 709/219 |
| 6,061,722 A | * | 5/2000 | Lipa et al. | 709/224 |
| 6,072,809 A | * | 6/2000 | Agrawal et al. | 370/503 |
| 6,104,392 A | * | 8/2000 | Shaw et al. | 345/335 |
| 6,122,658 A | * | 9/2000 | Chaddha | 709/203 |
| 6,151,632 A | * | 11/2000 | Chaddha et al. | 709/231 |
| 6,154,768 A | * | 11/2000 | Chen et al. | 709/203 |
| 6,161,137 A | | 12/2000 | Ogdon et al. | 709/229 |
| 6,185,625 B1 | * | 2/2001 | Tso et al. | 709/247 |
| 6,216,157 B1 | * | 4/2001 | Vishwanath et al. | 709/208 |
| 6,219,704 B1 | * | 4/2001 | Kim et al. | 709/224 |

(Continued)

FOREIGN PATENT DOCUMENTS

DE GB 2 330 429 4/1999

(Continued)

OTHER PUBLICATIONS

"WildTangent Announces Web Driver for Streaming Interactive 2D/3D Media", Jun. 24, 1999, pp. 1-11, XP002175099, retrieved from the Internet: URL:www-wave-report.com/1999%20Wave%20issues/wave9066.html> retrieved on Aug. 15, 2001! p. 1, paragraph 2 -p. 2, paragraph 2.

*Primary Examiner*—Bharat Barot
(74) *Attorney, Agent, or Firm*—Schwabe, Williamson & Wyatt, P.C.

(57) ABSTRACT

A novel method for streaming multi-media content is disclosed. Multiple versions of model data tailored for different operating environments differentiated in accordance with value(s) of at least one operating characteristic of remote requesting client computer systems are stored in a multi-media content providing server. A multi-media content player of a client computer system determines the operating characteristic value(s) for the at least one operating characteristic of the client computer system. The multi-media content player adaptively requests appropriate versions of selected ones of the model data, based at least in part on the determined operating characteristic value(s) of the at least one operating characteristic of the client computer system. In response, the providing server streams the requested versions of the requested model data to the multi-media content player for rendering. As a result, user experience at the client computer system is enhanced.

38 Claims, 6 Drawing Sheets

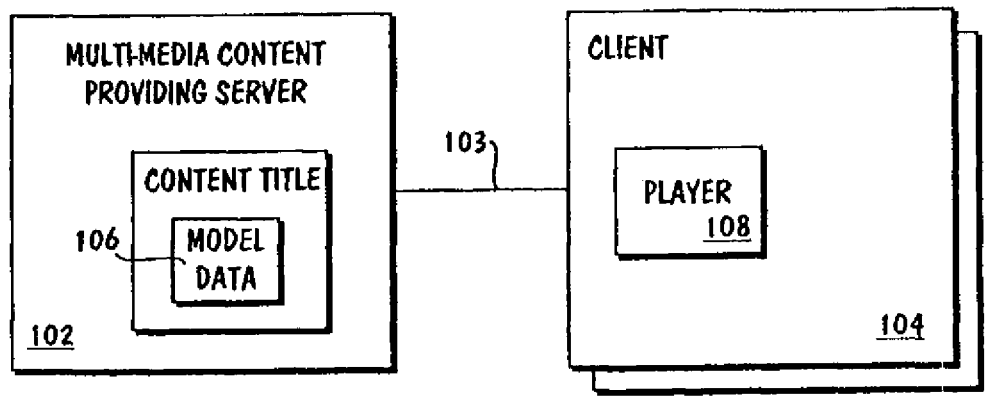

| WEIGHT | CPU | MEMORY | BANDWIDTH | BUS SPEED | DSP SUPPORT | GRAPHICS SUPPORT |
|---|---|---|---|---|---|---|
| 0 | 100 MHz | 8 MEG | 14.4 K | 60 MHz | NO | NO |
| .2 | 200 MHz | 16 MEG | 28.8 K | | | |
| .4 | 400 MHz | 32 MEG | 56 K | 100 MHz | | |
| .6 | 600 MHz | 64 MEG | DSL | | | |
| .8 | 800 MHz | 128 MEG | CABLE | 266 MHz | | |
| 1 | 1000 MHz | 256 MEG | T1 | | YES | YES |

* GEOMETRY, COLOR, TEXTURE, ANIMATION, LIGHTING, ETC.